United States Patent Office 2,989,515
Patented June 20, 1961

2,989,515
PROCESS OF COPOLYMERIZING AROMATIC DIENES AND MONOOLEFINS WITH CATALYST OF METAL HALIDE AND ORGANOMETAL COMPOUND
James Donald Bruton and William Franklin Gresham, Wilmington, and James Louis McPherson, Claymont, Del., assignors to E. I. du Pont de Nemours and Company, Wilmington, Del., a corporation of Delaware
No Drawing. Filed Aug. 13, 1956, Ser. No. 603,800
10 Claims. (Cl. 260—88.2)

This invention relates to a new class of polymeric materials. More particularly it relates to novel copolymers of aromatic dienes. The present application is a continuation-in-part of S.N. 470,522, filed November 22, 1954, now abandoned.

Heretofore it has been possible to polymerize certain aromatic dienes such as divinylbenzene with certain ethylenically unsaturated monomer such as styrene to crosslinked, insoluble, very brittle materials. In some instances it has been possible to obtain soluble and thus essentially non-crosslinked low molecular weight copolymers of aromatic dienes with ethylenically unsaturated compounds. These copolymers could be subsequently crosslinked but again formed brittle materials when crosslinked.

It is an object of the present invention to prepare new and useful polymeric materials. It is a further object to provide a novel process for polymerizing aromatic dienes with terminally unsaturated olefins. Another object is to polymerize aromatic dienes with alpha-olefins to polymeric materials of high molecular weight. Yet, another object of the present invention is to prepare solid polymeric materials capable of being crosslinked through heating or the addition of crosslinking agents. It is still another object of the present invention to prepare solid polymeric materials which on crosslinking remain tough and resilient. Other objects will become apparent hereinafter.

The word copolymer, as used herein, describes a class of polymeric materials obtained on polymerizing two classes of monomeric compounds, i.e., aromatic dienes and terminally unsaturated olefins. The term includes those polymeric materials obtained by polymerizing more than one specific aromatic diene with more than one specific olefin.

The objects of the present invention are accomplished by polymerizing at least one aromatic diene with at least one terminally unsaturated olefin in the presence of a catalyst obtained by admixing in an inert hydrocarbon solvent a polyvalent metal halide, wherein the metal is chosen from the group IV$b$, V$b$, and VI$b$, of the periodic table of elements, with an organometallic compound having at least one metal to hydrocarbon bond. The periodic table of elements employed is such as found in the Handbook of Chemistry and Physics, published by the Chemical Rubber Publishing Company, 37th ed., page 392. Specific examples of the polyvalent metal halides included are titanium tetrachloride, zirconium tetrachloride, vanadium oxytrichloride, molybdenum pentachloride, chromium tribromide. Specific examples of the compound containing at least one metal to hydrocarbon bond are lithium aluminum tetraalkyls, phenyl magnesium halides, aluminum trialkyls, and tin tetraalkyls. The catalyst employed in the process of the present invention is formed when the hereinabove defined components are admixed in a liquid diluent. It is believed that the polyvalent metal halide is reduced by the organometallic compound forming a catalytically active complex which will combine with ethylenically unsaturated monomers to cause polymerization of said monomer. It is believed that the monomer molecule involved in the polymerization is attached to the active polyvalent metal complex by a coordinate bond. These catalysts are therefore referred to herein as "coordination catalysts."

It has now been discovered that the hereinabove described catalyst system will copolymerize terminally unsaturated olefins with aromatic dienes to form solid substantially linear copolymers having surprising and useful properties. The copolymers obtained by the process of the present invention are solid polymeric materials containing vinyl or vinylidene unsaturation in the branches of the polymer chain. The aromatic diene-olefin copolymers are rapidly cross-linked through heating alone, although other cross-linking agents such as free radical producing compounds, acidic compounds, and conventional vulcanizing agents may also be employed to cure the polymer. The cross-linked copolymers are extremely tough and resilient materials if the polymer, prior to cross-linking, has a sufficiently high enough molecular weight. Similar to other high molecular weight hydrocarbon polymers, the aromatic diene copolymers of the present invention are slightly soluble in hydrocarbon solvents at elevated temperatures before any cross-linking has occurred. On cross-linking, however, the aromatic diene copolymers are almost insoluble in hydrocarbon solvents.

The aromatic dienes employed to prepare the novel copolymers of the present invention obtained by polymerization with a coordination catalyst are dienes in which two alkyl groups containing terminal vinyl or vinylidene groups, are separately attached to a benzene ring. The aromatic dienes employed, have therefore, the following general formula:

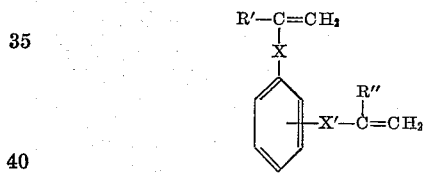

in which R' and R" may be hydrogen, methyl, ethyl groups or alkyl radicals of higher carbon content, and in which X and X' may be a carbon-to-carbon bond, a methylene group, or a larger divalent aliphatic radical. R' and R" may be the same or may be distinct radicals, thus R' may be a hydrogen and R" may be a methyl radical. Although X and X' are preferably a carbon-to-carbon bond or a divalent aliphatic radical, it is possible to employ as comonomers, aromatic dienes in which the vinyl group is separated from the benzene ring by any inert divalent radical. The two ethylenically unsaturated groups may be attached to the benzene ring in the ortho-, meta-, and para-position. The hydrogen on the remaining four carbon atoms of the benzene ring may be substituted by methyl, aliphatic groups of higher carbon content, halogens and substituted methylene groups.

However, bulky substituents such as long aliphatic chains and the like are less frequently employed since very little beneficial effect on such substituents is found in the resulting polymer and since the monomers are obtained only with difficulty and great expense. Preferred aromatic dienes used in the process of the present invention are therefore such compounds as ortho-, para-, meta-divinyl benzene, divinylxylene, diisopropenyl benzene, isopropenyl styrene, 4-(isopropenylphenyl)-butene-1, and ring halogenated divinyl benzenes.

The aromatic dienes employed in the present invention may be copolymerized with any terminally unsaturated olefin employing the coordination catalyst system described hereinabove. The preferred monomers of the present invention and those which give rise to the novel products of the present invention are ethylenically unsaturated hydrocarbon monomers having the following general formula:

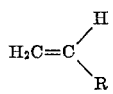

wherein R is a hydrogen atom, an aliphatic, aryl, or an aralkyl hydrocarbon radical. Preferred alpha-olefins employed in the process of the present invention are ethylene, propylene, butene-1, pentene-1, and other derivatives of ethylene having a higher number of carbon atoms in the alkyl chain.

The process of the present invention is endowed with great versatility and allows the preparation of copolymers suitable for many varied uses. Thus one or more aromatic dienes may be copolymerized with the olefin and similarly one or more olefins may be copolymerized with the aromatic diene to give rise to terpolymers. It is further possible to copolymerize mixtures of aromatic dienes with mixtures of olefins. Examples of such composite copolymers are ethylene-propylene-meta-divinyl benzene copolymers or ethylene-propylene-mixed divinylbenzene copolymers, wherein the divinylbenzene is a mixture of position isomers.

The ratio of the aromatic diene to the monoolefin in the copolymer may be varied over a wide scale and is controlled by the quantities of the monomer in the polymerization zone and the type of monomers employed. It is, in general, preferred to prepare copolymers having an aromatic diene content below 30% of the resin. Increasing the aromatic diene content will not improve the physical properties of the resin either before or after cross-linking and may decrease the fabricability of the copolymer due to premature cross-linking.

The cross-linking of the copolymers of this invention is generally accomplished by heating the copolymer to temperatures above 150° C. for periods which will vary with each individual copolymer. Premature cross-linking can be avoided by the addition of cross-linking inhibitors as disclosed in U.S. Patent 2,378,195. Those copolymers that do not cross-link readily through heating can be cross-linked through the addition of free radical or acidic catalysts such as hydrogen peroxide, benzoyl peroxide, boron trifluoride, phosphoric acid and the like. Friedel-Crafts type of catalysts may also be used in the cross-linking reaction.

The polymerization of the terminally unsaturated olefins with the aromatic dienes, according to the process of the present invention, can be carried out over a wide range of conditions. The polymerization may be carried out in bulk in the absence of a diluent or in the presence of an inert hydrocarbon solvent such as a saturated aliphatic, cycloaliphatic or aromatic hydrocarbon. Preferred solvents are n-hexane, cyclohexane, benzene, toluene, and xylene. The polymerization temperature can be as low as 0° C., or it can be as high as the decomposition points of the reactants, a generally suitable range being from 20 to 250° C. Superatmospheric pressure can be used and is desirably used with gaseous monomers, such pressures varying over a wide range, a suitable pressure range being from 1 to 2000 atmospheres. The pressure can be that of the gaseous monomers at the reaction temperature or it can be that produced by an extraneous inert gas such as nitrogen or helium.

The catalyst employed in the process of the present invention is obtained by admixing in a saturated hydrocarbon solvent a polyvalent metal halide, wherein the metal is chosen from group IVb, Vb, and VIb of the periodic table of elements with an organometallic compound having at least one metal to hydrocarbon bond. The catalyst components may be admixed prior to addition to the polymerization zone or may be admixed in the presence of the monomer. The ratio of the catalyst components may be varied over a wide range. Sufficient quantity of the organometallic compound should be present to be capable of reducing the valence of the metal salt to below 3. It is preferred to employ an excess of the organometallic component. In general very active catalyst are formed if the equivalent weight ratio of the organometallic component to the heavy metal salt component is between 0.3 and 10. However, no specific limits of catalyst component ratio applicable to all components has been determined and active catalyst may be found outside the limits stated. The quantity of the active catalyst may vary from 0.001 to 10% by weight of the total polymerizable materials.

The copolymerization of the aromatic dienes and the monoolefins according to the process of the present invention, takes place most satisfactorily when the polymerization is substantially moisture free and also free of other sources of hydroxyl groups. The polymerization process should be kept free of oxygen, or at least the oxygen content should be held below 20 parts per million.

The following examples are given to further illustrate the process of this invention and are not intended to limit the scope of this invention. Unless otherwise stated all parts are by weight.

*Example I*

(a) *Catalyst preparation.*—Into a reaction vessel was charged under a blanket of nitrogen, 200 parts of anhydrous cyclohexane having therein dissolved 4 parts of lithium aluminum hydride and 50 parts of butene-1. The reaction mixture was heated to 120° C. and maintained at that temperature for a period of 2.5 hours; the suspended solids were allowed to settle. The supernatant liquid contained dissolved lithium aluminum butyl.

In a separate reaction vessel 55 parts of titanium tetrachloride was dissolved under agitation in 100 parts of anhydrous cyclohexane.

(b) *Divinylbenzene ethylene copolymerization.*—Into a 330 ml. stainless steel vessel was placed 6.5 grams of commercial divinylbenzene (containing 55% of divinylbenzene, mostly meta), 25 ml. of the above described supernatant lithium aluminum tetrabutyl in cyclohexane and 50 ml. of the above described titanium tetrachloride in cyclohexane under a blanket of nitrogen. The reaction vessel was closed, flushed with nitrogen, evacuated, pressured to 1000 p.s.i. with ethylene and agitated at room temperature for a period of one hour. During that period the pressure dropped 900 p.s.i. A white solid polymer weighing 82 g. was obtained upon filtration and washing with a methanol-hydrochloric acid mixture, a methanol and aqueous sodium hydroxide mixture, methanol, water and acetone. The work up of the polymer was carried out under an atmosphere of nitrogen. The polymer was slightly soluble in boiling toluene. On heating the polymer no melt flow was noticed. The heated polymer could not be dissolved in boiling toluene. Tough, stiff films could be pressed from the polymer at 250° C. under a pressure of 20,000 lbs.

*Example II*

To a reaction mixture containing 25 ml. of the lithium aluminum tetrabutyl solution described in Example I and 100 ml. of the titanium tetrachloride solution described in Example I, was added 9 g. of commercial divinylbenzene under agitation whilst a stream of ethylene was bubbled through the reaction mixture. Upon complete addition of the divinylbenzene, the ethylene stream was maintained for an additional 45 minutes. Intermittent cooling was applied to keep the reaction temperature under 60° C. The polymer was isolated by filtration and washed with a hydrochloric acid methanol mixture, a methanol aqueous sodium hydroxide mixture, methanol, water and finally acetone. All work-up procedures were carried out in a nitrogen atmosphere. Upon drying at 80° C., 27.5 g. of a solid polymer was obtained. The polymer was slightly soluble in boiling toluene. On heating to 250° C. no melt flow was observed. Polymer heated to 250° C. could not be dissolved in boiling toluene. A tough, clear and stiff film could be obtained on compression molding at 250° C.

*Example III*

To a reaction vessel was added under a blanket of nitrogen 25 ml. of the lithium aluminum tetrabutyl solution described in Example I, 50 ml. of the titanium tetrachloride solution described in Example I, and 10 g. of commercial divinylbenzene. Into this reaction mixture propylene was bubbled over a period of 5¼ hours while maintaining the temperature at 27 to 32° C. The solid polymer isolated from the mixture, was washed with a methanol and hydrochloric acid mixture, a methanol and aqueous sodium hydroxide mixture, water and acetone under a blanket of nitrogen. The dry polymer weighed 6.7 g. On heating to 180° C. the polymer exhibited a melt index value of 73.7 which rapidly decreased with heat exposure time (melt index test see ASTM D-1238-52-T). A film pressed from the polymer at 200° C. was stiff. The polymer prior to heating was slightly soluble in boiling chlorobenzene. Upon heating the polymer to 250° C. the polymer could not be repressed and was insoluble in boiling chlorobenzene.

*Example IV*

To a 330 ml. stainless steel autoclave was added 25 ml. of the lithium aluminum tetrabutyl solution and 50 ml. of the titanium tetrachloride solution, described in Example I, and 10 g. of commercial divinylbenzene under a blanket of nitrogen. The reaction vessel was evacuated and pressured to 100— p.s.i. with propylene at a temperature of 100° C. for a period of 1 hour. The resulting polymer was filtered and washed with a methanol-hydrochloric acid mixture, methanol-aqueous sodium hydroxide mixture, methanol, water and finally with acetone. All work up procedures were carried out under a blanket of nitrogen. The yield of the dry polymer was 9 g. The polymer was soluble in boiling chlorobenzene and was found to have very little melt flow. A tough, limp film could be pressed under 20,000 lbs. at a temperature of 250° C. and after heating to 250° C. for 10 minutes the polymer was no longer soluble in boiling chlorobenzene.

*Example V*

Into a 330 ml. stainless steel pressure vessel was placed under a blanket of nitrogen 0.015 moles of lithium aluminum tetrabutyl and 0.01 moles of titanium tetrachloride dissolved in 100 ml. of cyclohexane. The reaction mixture was cooled to −50° C., evacuated and flushed with nitrogen and on reevacuation 0.10 moles of 1,3-diisopropenyl benzene and 1 mole of ethylene were added. The reaction vessel was then heated under autogenous pressure for a period of 1 hour at 100° C. The polymer was filtered and washed as described in the preceding examples. Upon drying 24.3 g. of a white polymer was obtained. A tough, clear film having a density of 0.928 could be pressed under a pressure of 20,000 p.s.i. and at a temperature of 200° C. Upon heating at 250° C. for a period of 3 hours and under a blanket of nitrogen 70% of the unsaturation measured in the polymer by infrared spectroscopy (bands at 6.1, 6.25, 6.35, 11.25, and 12.55 microns) was found to have disappeared. The heated polymer was not soluble in boiling chlorobenzene.

*Example VI*

Into a 330 ml. stainless steel pressure vessel was charged under an atmosphere of nitrogen 200 ml. of cyclohexane, 0.01 mole of titanium tetrachloride and 0.014 mole of lithium aluminum tetraheptyl. To the reaction mixture was then added 10 ml. of commercial divinylbenzene and 60 g. of propylene. The reaction mixture was then heated under autogenous pressure to 100° C. for a period of 2 hours with continuous agitation. On cooling the reaction vessel to room temperature the reaction mixture was poured into excess methanol. The precipitated solid copolymer of divinylbenzene and propylene was filtered, washed with a dilute solution of vinyl stearate and on drying was found to weigh 7 g. The copolymer could be compression molded into tough elastic films by heating the copolymer to 200° C. under pressure. The copolymer was found to have a melt index of 0.14 as measured by the A.S.T.M. D-1238-52-T test method, indicating good melt flow properties. The melt index was reduced on prolonged heating. A film of the copolymer was heated to 150° C. and stretched 300% in both the vertical and horizontal direction. The film was cooled to room temperature under tension and retained the stretched shape at room temperature. On heating the stretched film to 150° C. the film returned to its original size.

*Example VII*

Into a glass vessel equipped with stirrer, reflux condenser, gas inlet and outlet means was charged 200 ml. of cyclohexane, 0.008 mole titanium tetrachloride, 0.01 mole of lithium aluminum tetraethylcyclohexenyl and 10 ml. of divinylbenzene. Propylene was bubbled through the mixture at a rate of 300 ml./min. The reaction mixture was agitated and the temperature was maintained at 25° C. Polymerization was continued for a period of 90 minutes. The reaction mixture was poured into excess methanol. The precipitated copolymer was slightly soluble in hot decahydronaphthalene prior to heating but became insoluble after heating.

*Example VIII*

Into a glass vessel equipped with stirrer, reflux condenser, gas inlet and outlet means was charged 250 ml. of decahydronaphthalene, 0.01 mole of titanium tetrachloride, 0.014 mole of aluminum triheptyl and 10 ml. of commercial divinyl benzene. The reaction mixture was agitated and propylene was passed through the reaction mixture at the rate of one liter/min. The polymerization was continued at 25° C. for a period of one hour. On pouring the reaction mixture into excess methanol, filtering, washing and drying, 4.4 g. of a rubbery solid copolymer was obtained which was slightly soluble in hot xylene.

*Example IX*

Into a glass reaction vessel equipped with stirrer, reflux condenser and gas inlet and outlet means was charged 200 ml. of ortho-dichlorobenzene, 0.01 mole of titanium tetrachloride, 0.014 mole of lithium aluminum tetraheptyl and 10 ml. of commercial divinylbenzene. The reaction mixture was heated to 60-70° C. and propylene was bubbled through the reaction mixture at a rate of 500 ml./mm. The polymerization was continued for a period of two hours. The cooled reaction mixture was poured into excess methanol and the copolymer was filtered, washed and dried. A yield of 8.2 g. was obtained. The polymer could be pressed into clear films which showed a 7.8% divinylbenzene content as measured by infrared spectroscopy. The inherent viscosity of the polymer, as measured in decahydronaphthalene at 53° C. was 0.5. The polymer was soluble in decahydronaphthalene and ortho-dichlorobenzene.

*Example X*

Into a glass reaction vessel equipped with stirrer, reflux condenser, gas inlet and outlet means was charged 250 ml. of ortho-dichlorobenzene, 0.01 mole of titanium tetrachloride, 0.014 mole of lithium aluminum tetraheptyl and 10 ml. of commercial divinylbenzene. Propylene was then continuously passed through the reaction mixture at a rate of 400 ml./min. The polymerization was continued at a temperature of 25 to 30° C. for a period of 1 hour. The copolymer obtained from the reaction mixture was washed with a dilute solution of vinyl stearate and on drying 4.8 g. of a copolymer was obtained which was found to contain approximately 3% divinylbenzene as measured by infrared analysis. The polymer was found to have a melt index of 0.1, as measured by the A.S.T.M. D–1238–52–T test method indicating a good melt flow. To the polymer was then added 0.05 g. of alpha, alpha-bis-azo-iso-butyronitrile and on heating the polymer cured to a tough insoluble resin, which did not show any indication of melt flow.

*Example XI*

Into a glass reaction vessel equipped with reflux condenser, stirrer, gas inlet and outlet means was charged under an atmosphere of nitrogene 250 ml. of cyclohexane, 0.01 mole of titanium tetrachloride, 0.014 mole of aluminum triheptyl, 25 g. of octadecene-1 and 13 g. of commercial divinylbenzene. The reaction mixture was heated to 120° C. and polymerization was continued for 17 hours at that temperature. The reaction mixture was cooled and poured into excess methanol. The precipitated copolymer of divinylbenzene and octadecene-1 was filtered, washed and on drying weighed 17.2 g. The polymer was slightly soluble in hot decahydronaphthalene prior to heating. Brittle clear films could be compression molded from the polymer by heating to 200° C. under pressure. The heated polymer was insoluble.

*Example XII*

Into a glass reaction vessel equipped with stirrer, reflux condenser, gas inlet and outlet means was charged 250 ml. of cyclohexane, 0.01 mole of titanium tetrachloride, 0.014 mole of aluminum triheptyl, 25 g. of octadecene-1 and 13 g. of commercial divinylbenzene. Propylene was passed through the agitated reaction mixture at the rate of 1 liter/min. The temperature was maintained at 25° C. The polymerization was continued for a period of 90 min. On pouring the reaction mixture into an excess of methanol the precipitated copolymer of divinylbenzene, octadecene-1 and propylene was filtered, washed and dried. The solid copolymer weighed 3 g., was soluble before heating and could be molded into rubbery films by heating under pressure.

*Example XIII*

Into a 330 ml. stainless steel pressure vessel having a capacity of 330 ml. was charged 50 ml. of cyclohexane, 0.01 mole of titanium tetrachloride, 0.015 mole of lithium aluminum tetraethylcyclohexenyl, 60 g. of hexene-1 and 10 mol. of commercial divinylbenzene. The reaction was heated to 75° C. under autogenous pressure. The polymerization was continued for 2 hours. The cooled reaction mixture was poured into excess methanol and the precipitated copolymer was filtered, washed and dried. A high molecular weight copolymer of hexene-1 and divinylbenzene was obtained weighing 25.5 g. The polymer could be cured by heating and showed good elastic properties when cured.

*Example XIV*

Into a 330 ml. stainless steel pressure vessel having a capacity of approximately 330 ml. was charged 100 ml. of cyclohexane, 0.01 mole of titanium tetrachloride, 0.01 mole lithium aluminum tetraethylcyclohexenyl, 30 g. of butene-1, 10 ml. of commercial divinylbenzene. The reaction mixture was heated under autogenous pressure to 100° C. and agitated for one hour at that temperature. From the resultant reaction mixture 6.3 g. of a solid copolymer of butene-1 and divinylbenzene was isolated. On heating to 200° C. under pressure, stiff, brittle films were obtained which were insoluble in hydrocarbon solvents.

*Example XV*

Into a glass reaction vessel equipped with stirrer, reflux condenser, gas inlet and outlet means was charged 250 ml. of ortho-dichlorobenzene, 0.01 mole of vanadium tetrachloride, 0.014 mole of lithium aluminum tetraheptyl and 10 ml. of commercial divinylbenzene. The reaction mixture was maintained at 25 to 30° C. while propylene was passed through the reaction mixture at the rate of 400 ml./min. Polymerization was continued for one hour. The copolymer recovered from the reaction mixture weighed 20 g. The polymer was found to have a melt index value of 0.01 as measured by the A.S.T.M. D–1238–52–T test method. The polymer could be cured by heating.

*Example XVI*

Into a 330 ml. stainless steel vessel was charged under an atmosphere of nitrogen 100 ml. cyclohexane, 0.01 mole of lithium aluminum tetrabutyl, 0.05 mole of divinylbenzene and 0.2 mole of butene-1. The reaction mixture was heated under autogenous pressure to 200° C. and agitated at that temperature for a period of one hour. The cooled reaction mixture was poured into excess methanol and the precipitated copolymer was washed, and on drying was found to weigh 9.4 g. The copolymer was partially soluble in hot xylene. The divinylbenzene content in the copolymer varied from 5.96% in the soluble copolymer to 8.69% in the insoluble portion. The polymer could be compression molded into tough flexible films by heating to 200° C. under pressure. The heated polymer was not soluble.

*Example XVII*

Into a 330 ml. stainless steel pressure vessel was charged under an atmosphere of nitrogen 100 ml. of cyclohexane, 0.01 mole of titanium tetrachloride, 0.01 mole of lithium aluminum tetracyclohexenylethyl and 5 ml. of commercial divinylbenzene. The nitrogen was replaced by hydrogen and the reaction vessel was pressured with 20 g. of ethylene and 20 g. of propylene. The reaction mixture was agitated at room temperature for a period of 2 hours. The excess monomer was then removed and the reaction mixture was poured into excess methanol. There was obtained 17 g. of a terpolymer of ethylene, propylene and divinylbenzene, having an inherent viscosity of 1.24 as measured in decahydronaphthalene at 53° C.

*Example XVIII*

Into a glass reaction vessel fitted with a stirrer, reflux condenser, and a gas inlet and outlet was charged under nitrogen 300 ml. of cyclohexane, 28 ml. of decahydronaphthalene containing 0.014 mole of lithium aluminum tetraheptyl and 0.01 mole of titanium tetrachloride. The reaction mixture was stirred for 10 minutes until the catalytically active finely dispersed dark precipitate had formed. To this mixture was added 10 g. of isopropenylstyrene and ethylene was passed through the mixture at the rate of 500 ml./min. Polymerization was continued for 30 minutes. The reaction mixture was poured into excess methanol causing the polymer to precipitate. On filtering, washing and drying, a solid polymeric product weighing 13.5 g. was obtained. The polymer was soluble in hot decahydronaphthalene and was found to have an inherent viscosity of 6.0 at 53° C. The polymer could be molded into tough clear films at 300° C. Infrared analysis of the film showed the presence of aromatic unsaturation in the polymer. The film obtained on hot molding was insoluble in boiling decahydronaphthalene. The tensile impact strength of the crosslinked insoluble polymer was 125 ft. lb./in.$^2$

*Example XIX*

Into a 330 ml. stainless steel autoclave was charged under nitrogen, 100 ml. cyclohexane, 0.014 mole of lithium aluminum tetraheptyl, 0.01 mole of titanium tetrachloride and 8.5 g. of isopropenyl styrene. The autoclave was then charged with 20 g. of ethylene and heated under autogenous pressure to 100° C. for a period of one hour under constant agitation. Thereafter the reaction vessel was cooled to room temperature, excess monomer removed and the reaction mixture poured into excess methanol. The precipitated polymer was filtered, washed and dried. A solid polymeric product weighing 9 g. was isolated. The polymer could be molded into tough films at 300° C. Infrared analysis of the polymer showed the presence of aromatic unsaturation and absorption in bands characteristic of polyethylene. Although the unheated polymer could be dissolved in decahydronaphthalene the heated polymer was insoluble.

Example XX

Into a glass reaction vessel fitted with a stirrer, reflux condenser and a gas inlet and outlet was charged under nitrogen, 500 ml. of cyclohexane, 0.014 mole of lithium aluminum tetraheptyl, and 0.01 mole of titanium tetrachloride. The reaction mixture was stirred for 10 minutes at a temperature of 25 to 35° C. and then 15 g. of 4-(isopropenylphenyl)-butene-1 was added dropwise while ethylene was passed through the reaction mixture simultaneously at a rate of 500 ml./min. for a period of 30 minutes. The resulting reaction mixture was poured into excess methanol and the polymer precipitate resulting was washed, filtered and dried. A solid product weighing 14 g. was obtained. The polymer was soluble in hot decahydronaphthalene and could be molded into tough clear films at 200° C. On heating to this temperature the polymer was insoluble in boiling decahydronaphthalene. Infrared analysis of the copolymer indicated that the copolymer contained 10% by weight of 4-(isopropenylphenyl)-butene-1. The copolymer film was found to have a tensile impact strength of 487 ft. lb./in.$^2$ The present invention as illustrated by the examples provides for the preparation of a large number of novel copolymers with greatly varied properties suitable for a large number of applications. The catalyst employed in the present invention allows the preparation of essentially linear copolymers from aromatic dienes and terminally unsaturated hydrocarbon monomers, and results in polymeric products containing vinyl unsaturation in the side chains of the polymer molecule. The aromatic dienes employed in the present invention in combination with the reduced transition metal catalyst cause extremely vigorous polymerization resulting in high molecular weight polymeric products of essentially thermoplastic nature, which are capable of becoming thermoset. The free vinyl groups in the uncured polymer may be modified as to quantity and type to suit the purpose to which the polymer is to be put. Thus if a rapidly cross-linking copolymer is desired, an unsubstituted vinyl group is employed on the aromatic ring such as in divinylbenzene. If it is desirable to have a slowly cross-linking copolymer a substituted vinyl group such as found in isopropenyl styrene is employed. The quantity of the aromatic diene employed will determine to some extent the physical properties of the copolymer. Thus a highly rigid, stiff, temperature resistant copolymer is obtained when the aromatic diene content of the polymer is high.

Of particular interest are the aromatic diene/alpha-olefin copolymers which contain less than 10% of the aromatic diene. These copolymers may be melt extruded, injection molded, and fabricated by conventional means to produce films, tubes and massive articles which on fabrication are essentially cross-linked. The cross-linked articles obtained from these copolymers are extremely tough, having tensile impact strengths up to 1200 ft. lbs./in.$^2$, they are elastic and retain their properties over a wide range of temperature. However, particularly outstanding and surprising is the elastic memory of the cross-linked aromatic diene/alpha-olefin copolymers. When the cured copolymers are heated to above 100° C. they are highly elastic and may be stretched 500 to 800%, but when cooled to room temperatures under tension in the stretched state retain their shape. On reheating the polymer to approximately the stretching temperature the copolymer contracts to its original shape. Thus the stretching operation does not cause any drawing of the polymer molecule. This surprising elastic memory of the polymer is highly desirable in a large number of applications which involve shrink-fitting.

The terminally unsaturated olefins employed in the present invention have per se a lesser effect on the final properties of the copolymer, but are highly useful in controlling the quantity of the aromatic diene in the copolymer and the molecular weight of the copolymer. Thus by replacing ethylene with propylene and higher olefins which are less reactive than ethylene it is possible to decrease the high molecular weights formed by the extremely reactive system of ethylene, an aromatic diene and a reduced transition metal catalyst. Furthermore, aromatic dienes add less readily to a substituted olefin in a growing polymer chain so that it is possible to thereby decrease the aromatic diene content of the polymer. Since terminally unsaturated monomers polymerize readily with each other employing a coordination catalyst, more than one terminally unsaturated monomer may be employed to produce copolymers of specific properties.

The copolymers of the present invention may be employed in a large number of applications. The copolymers can be fabricated into films, foils, fibers, and massive articles, which are characterized by their extreme toughness. The copolymers may be employed for wire coating and other dielectric applications. The copolymers of the present invention are highly suitable for coating applications. The copolymer may further be used as resins in the preparation of reinforced plastic laminates with glass and other synthetic fibers. The surprising elastic memory of the copolymers makes them highly useful in the manufacture of heat shrinkable film and bands for the packaging of food and the sealing of containers.

As many apparently widely different embodiments of this invention may be made without departing from the scope and spirit thereof, it is to be understood that this invention is not limited to the specific embodiments thereof except as defined in the appended claims.

We claim:

1. The process of polymerizing an aromatic monomer having the general formula

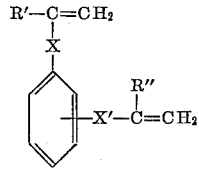

wherein R' and R'' are selected from the class consisting of hydrogen and alkyl radicals, and X and X' are selected from the class consisting of carbon to carbon bonds and divalent aliphatic radicals, with a terminally unsaturated olefin having the general formula $RHC=CH_2$ wherein R is selected from the class consisting of hydrogen and a methyl radical, which comprises polymerizing said monomers at a temperature of 20 to 250° C. with a catalyst obtained on admixing an aluminum alkyl compound with a halide, selected from the class consisting of titanium halides and vanadium halides, in a molar ratio of from 0.3 to 10 in the presence of an inert hydrocarbon solvent, and recovering a copolymer of said divinyl aromatic monomer and olefin.

2. The process of claim 1 wherein the aluminum alkyl compound is an aluminum trialkyl.

3. The process of claim 1 wherein the aluminum alkyl compound is a lithium aluminum tetraalkyl.

4. The process as set forth in claim 1 wherein the aromatic monomer is divinyl benzene.

5. The process as set forth in claim 4 wherein the terminally unsaturated olefin is ethylene.

6. The process as set forth in claim 4 wherein the terminally unsaturated olefin is propylene.

7. The process as set forth in claim 1 wherein the aromatic monomer is diisopropenyl benzene.

8. The process as set forth in claim 7 wherein the terminally unsaturated olefin is ethylene.

9. The process as set forth in claim 1 wherein the aromatic monomer is isopropenyl styrene.

10. The process as set forth in claim 9 wherein the terminally unsaturated olefin is ethylene.

References Cited in the file of this patent

UNITED STATES PATENTS

| | | |
|---|---|---|
| 2,089,444 | Staudinger | Aug. 10, 1937 |
| 2,213,423 | Wiezevich | Sept. 3, 1940 |
| 2,378,195 | D'Alelio | June 12, 1945 |
| 2,405,817 | D'Alelio | Aug. 13, 1946 |
| 2,609,363 | Welch | Sept. 2, 1952 |
| 2,721,189 | Anderson et al. | Oct. 18, 1955 |
| 2,699,457 | Ziegler et al. | Jan. 11, 1955 |
| 2,731,450 | Serniuk et al. | Jan. 17, 1956 |
| 2,773,052 | Cohen et al. | Dec. 4, 1956 |

FOREIGN PATENTS

| | | |
|---|---|---|
| 497,643 | Great Britain | Dec. 22, 1938 |
| 682,771 | Great Britain | Nov. 19, 1952 |
| 538,782 | Belgium | Dec. 6, 1955 |

UNITED STATES PATENT OFFICE
CERTIFICATE OF CORRECTION

Patent No. 2,989,515              June 20, 1961

James Donald Bruton et al.

It is hereby certified that error appears in the above numbered patent requiring correction and that the said Letters Patent should read as corrected below.

Column 6, line 53, for "500 ml./mm." read -- 500 ml./min. --; column 7, line 48, for "10 mol." read -- 10 ml. --.

Signed and sealed this 14th day of November 1961.

(SEAL)
Attest:

ERNEST W. SWIDER
Attesting Officer

DAVID L. LADD
Commissioner of Patents